No. 712,178. Patented Oct. 28, 1902.
R. N. CHAMBERLAIN.
SEPARATOR FOR STORAGE BATTERY PLATES.
(Application filed May 13, 1901.)
(No Model.)
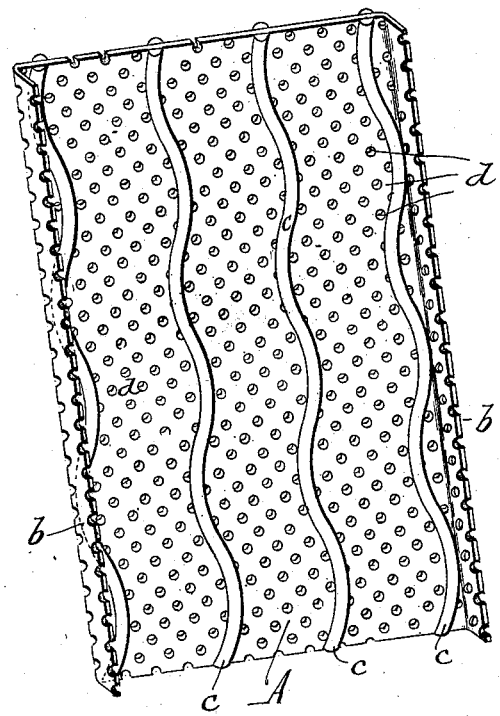
Fig. 1.
Fig. 2.
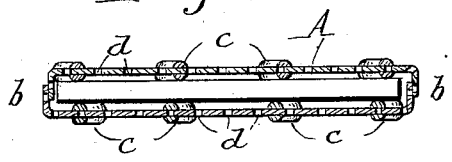
Fig. 3.
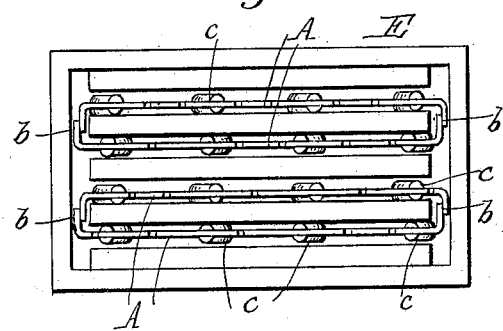
Fig. 4.
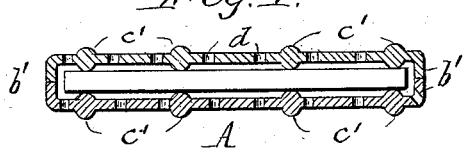
Fig. 5.
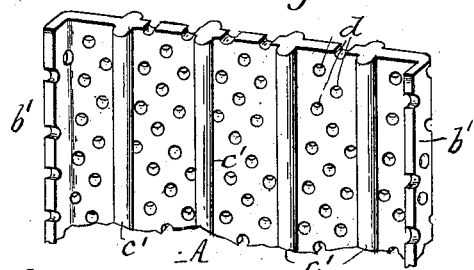
Witnesses:
F. F. Scherzinger
Henry L. Deck
R. N. Chamberlain, Inventor.
By Wilhelm & Bonner, Attorneys.
THE NORRIS PETERS CO., PHOTO-LITHO., WASHINGTON, D. C.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

SEPARATOR FOR STORAGE-BATTERY PLATES.

SPECIFICATION forming part of Letters Patent No. 712,178, dated October 28, 1902.

Application filed May 13, 1901. Serial No. 59,904. (No model.)

*To all whom it may concern:*

Be it known that I, RUFUS N. CHAMBERLAIN, a citizen of the United States, residing at Depew, in the county of Erie and State of New York, have invented new and useful Improvements in Separators for Storage Batteries, of which the following is a specification.

This invention relates to the separators which are arranged in storage batteries between adjacent electrodes of different polarity for insulating the same.

The object of this invention is to produce a separator of this kind which is of such construction that two like separators can be arranged to inclose one of the electrodes not only at the flat faces thereof, but at the upright side edges, whereby the danger of bridging or short-circuiting at the sides by material dropping from the plates and lodging at the edges thereof is avoided.

In the accompanying drawings, Figure 1 is a perspective view of my improved separator provided with ribs of wavy form. Fig. 2 is a horizontal section showing two of these separators inclosing an electrode, which is shown in plan view, the separators being arranged to overlap each other with their side flanges. Fig. 3 is a top plan view of a cell or element of a battery containing two pairs of my improved separators, each pair inclosing one of the positive electrodes. Fig. 4 is a horizontal section of a pair of my improved separators inclosing an electrode and arranged with the side flanges abutting against each other, the separators being provided with straight ribs. Fig. 5 is a fragmentary perspective view of this last-mentioned style of separator.

Like letters of reference refer to like parts in the several figures.

My improved separator consists of a flat plate A of proper size and form to separate the electrodes and constructed to permit the passage of the electrolyte through the plate. This plate is provided along its upright side edges with flanges *b*, which project from the plate in the same direction. The plate is provided on both sides between the flanges with spacing ribs or projections *c*, which bear against the electrode and hold the plate at a short distance from the electrode, so as to form unobstructed flow-spaces for the electrolyte between the ribs or projections.

When the plate is constructed of hard rubber or other impervious material, it is provided with perforations *d*, and the ribs *c* are cemented to the plate, on opposite sides thereof, the ribs on one side coinciding with those on the other. The side flanges *b* are bent on the plate in molding the same, and as the plate and the flanges are comparatively thin the flanges are made of such width that when two separators are placed against opposite sides of an electrode with their flanges projecting toward each other the flanges will overlap, as shown in Figs. 2 and 3, with the outer side of one flange resting against the inner side of the adjacent flange.

In assembling the electrodes and separators, as shown in Fig. 3, each positive electrode is inclosed by a pair of separators, the side flanges of the separators inclosing the upright side edges of the electrode. This arrangement of the separators insures the inclosing of the side edges of the electrodes and prevents conducting material which has dropped from the electrodes at the sides from lodging and bridging the space between two electrodes, which is liable to occur when the separators do not inclose the side edges of the electrodes and which results in short-circuiting. As the separators are all of one size and pattern for electrodes of the same size, any two separators picked up at random will form a pair, whereby the operation of assembling the parts is greatly simplified. In some cases these electrodes may become bent at the edges to such an extent that they come in contact beyond the side edges of the separators, and so cause short-circuiting. This is also prevented by my improved separators.

The separators are made of such width that they fit snugly between the sides of the jar E of the battery element, whereby the flanges of the separators are supported and prevented from being bent outwardly or straightened out.

When the separator plates and flanges are comparatively thick, as they are when the separators are made of earthenware or similar material, the flanges can be made so short that they will abut against each other, as shown in Figs. 4 and 5. In these figures, $b'$ represents the flanges, and $c'$ the ribs. The latter are shown in these figures as straight bars arranged vertically on the flat faces of the plates of the separators.

I claim as my invention—

1. A separator for storage batteries, consisting of a plate of non-conducting material having on its flat faces upright spacing-ribs adapted to rest against the electrode and provided at its upright sides with flanges which project both in the same direction and are of greater width than said spacing-ribs, substantially as set forth.

2. A separator for storage batteries, consisting of a perforated plate of non-conducting material having on its flat faces upright spacing-ribs adapted to bear against the electrode and provided at its upright sides with flanges which project both in the same direction and are of greater width than said spacing-ribs, substantially as set forth.

3. The combination with an electrode, of two separators, each composed of a plate of non-conducting material having on its flat faces upright spacing-ribs adapted to bear against the electrodes and provided at its upright sides with flanges which project both in the same direction and are of greater width than said spacing-ribs, the side flanges of one plate projecting past the side flanges of the other, substantially as set forth.

Witness my hand this 7th day of May, 1901.

RUFUS N. CHAMBERLAIN.

Witnesses:
JNO. J. BONNER,
C. M. BENTLEY.